Patented Sept. 15, 1942

2,295,612

UNITED STATES PATENT OFFICE 2,295,612

SEPARATION OF RESIN-FORMING AROMATIC HYDROCARBONS FROM MIXTURES BY SOLVENT EXTRACTION

Frank J. Soday, Upper Darby, Pa., assignor to The United Gas Improvement Company, a corporation of Pennsylvania No Drawing. Application April 6, 1939,
Serial No. 266,411

12 Claims. (Cl. 260—669)

This invention pertains generally to the solvent extraction of light oil fractions for the purpose of segregating in concentrated form desired unsaturated hydrocarbons.

The invention pertains more particularly to the concentration or purification of light oil unsaturated hydrocarbons wherein is employed as the reagent one or more polyhydric alcohols, that is, one or more aliphatic hydrocarbons having at least two substituent groups attached thereto, at least two of which are hydroxyl groups.

Examples of the foregoing reagents are ethylene glycol, propylene glycol, dimethylene glycol, diethylene glycol, triethylene glycol, tetraethylene glycol, dipropylene glycol, alpha-butylene glycol, beta-butylene glycol, butandiol-1,3, butanetriol-1,2,3, tetramethylene glycol, isobutylene glycol, tetramethyl glycol, glycerol, erythritol, penta-erythritol, the pentahydric alcohols and the hexahydric alcohols.

Of the polyhydric alcohols, those having not more than 4 hydroxyl groups are preferred. Diethylene glycol, triethylene glycol, tetraethylene glycol, and propylene glycol are particularly suitable.

Examples of derivatives of polyhydric alcohols coming within the above definition are monoacetin, glycerol alpha-monochlorohydrine, alpha-glycerol monoethyl ether, and the commercial blends of polyhydroxy compounds known in the trade as Glycapon AA, Glycapon 2K, Aqualube, Glucarine B and Hygropon.

In the various processes for the manufacture of artificial gas, such as oil gas, carburetted water gas, or coal gas, considerable quantities of tar are produced, and the gas contains substantial quantities of other more or less readily condensible materials.

The latter condensates as well as the distillate from the tar will be referred to herein generally as light oil and comprise a source for many resin-forming unsaturated aromatic hydrocarbons, such as styrene, substituted styrene, indene, substituted indene, etc.

Examples of substituted styrenes are the nuclear substituted styrenes, such as ortho-methyl styrene, meta-methyl styrene, para-methyl styrene, substituted styrenes in which the substituent group, or groups, is located in the side chain, such as alpha-methyl styrene and beta-methyl styrene, and substituted styrenes in which the substituent groups are located both on the nucleus and in the side chain, such as para-methyl-beta-ethyl styrene.

Examples of substituted indenes are methyl indene, ethyl indene, etc.

With ordinary methods of fractional distillation as now practiced, it is impossible to separate the resin-forming unsaturated aromatic hydrocarbons in a substantially pure state because of the presence of other materials which apparently are either of similar boiling point, or are capable of forming azeotropic mixtures with the desired unsaturated aromatic hydrocarbons.

Furthermore, the fact that the unsaturated aromatic hydrocarbons are polymerizable with heat adds to distillation difficulties.

As a result of the foregoing, a typical styrene fraction obtained by ordinary distillation processes will usually contain hardly more than 50% styrene, and a typical indene fraction will usually contain hardly more than 80% indene.

While fractions of this concentration may, in general, be employed satisfactorily for the manufacture of synthetic resin by polymerization, it is found that the resulting resins are very frequently too inferior with respect to color, color stability, electrical resistance, molding properties, freedom from crazing, thermal stability, melting point, specific viscosity, molecular weight, and mechanical strength, to be of any considerable value.

I find that the foregoing deficiencies are, in general, traceable to the presence during the polymerization of highly undesirable contaminating materials.

Furthermore, resins of superior quality may be produced if the fractions are of higher concentration.

While solvent extraction methods have reached a high stage of development in the purification of lubricating oils, I have found that most of the solvents which have been employed for this purpose, or which have been recommended for use in such industry, are wholly unsuited for the refining of the resin-forming unsaturated aromatic hydrocarbons.

A solvent suitable for the separation of the resin-forming unsaturated aromatic hydrocarbons from light oil distillation fractions containing the same should possess properties as follows:

1. A high perferential affinity for the resin-forming unsaturated aromatic hydrocarbons, such affinity being greater than the affinity for the desired hydrocarbons of the other constituents present in the light oil fraction.

2. A low solvent power for materials other than the desired hydrocarbons.

3. Low solubility in materials other than the desired hydrocarbons.
4. High chemical stability under operating conditions.
5. Chemical inertness.
6. Either a boiling range sufficiently different from that of the desired hydrocarbon to permit ready separation by distillation, or a high preferential solubility in some other solvent, such as water, in which the desired hydrocarbon is almost totally insoluble.
7. No tendency to exert undesirable pathological effects upon the operating personnel.
8. Low price.
9. Non-corrosive to the ordinary materials of construction, such as iron and steel.
10. Low heat of vaporization.
11. A density appreciably different from that of the desired hydrocarbon.
12. Incapable of introducing into the desired hydrocarbon undesirable constituents such as sulfur compounds.

I have discovered that the foregoing reagents generally, are ideally suited to the solvent extraction of resin-forming unsaturated aromatic light oil hydrocarbon fractions for the purpose of producing purified and concentrated solutions thereof.

Reagents which are liquid at normal operating temperatures are preferred. However, mixtures of reagents, one or more of which are a solid at normal operating temperatures, may be employed without departing from the spirit of the invention.

In addition, elevated temperatures in general, may be employed in order to permit the use of reagents which are normally solid at lower temperatures.

Furthermore, mixtures containing one or more reagents and one or more viscosity reducing substances, such as water or a monohydric alcohol, may be employed.

Moreover, a viscosity reducing substance may be added at any stage of the refining operation.

Likewise, mixtures containing one or more reagents and a solubility reducing substance, such as water, may be employed.

Also a solubility reducing substance may be added at any stage of the refining operation.

Contact between the reagent and the hydrocarbon fraction under treatment may be effected in any desired manner, for instance, in any one or more of the ways disclosed in the art for the solvent extraction of lubricating oils. This includes batch contact, multiple batch contact, batch counter-current contact, continuous counter-current contact, all of which may be employed with or without the use of refluxing, precipitating agents, increasing or decreasing the selectivity or solvent power of the reagent, etc.

The use of reflux when employing batch counter-current or continuous counter-current contact has been found to greatly increase the efficiency of the process.

Any desired temperature consistent with the solubility in the reagent of the hydrocarbon material under treatment may be employed.

For example, temperatures ranging from $-60°$ C. to $100°$ C., or more, may, in general, be employed. Excellent results have been obtained through the use of temperatures ranging from $-20°$ C. to $50°$ C.

In general, the use of reasonably low operating temperatures will be found to result in a greater spread in concentration of the desired hydrocarbon between the extract and raffinate phases.

Furthermore, temperatures may vary throughout the extraction process, that is, different temperatures may be employed at various stages of the process.

For example, the temperature at the start of the process may be sufficiently high to cause all of the hydrocarbon fraction to dissolve in the reagent, after which a more moderate temperature may be employed in order to form the desired two phases. By a proper regulation of the temperature in the final stratification step, almost any desired ratio of raffinate and extract phases may be secured.

While when the temperature does not greatly exceed $50°$ C. atmospheric pressures will be found suitable, in the event of the use of high temperatures consideration must be given to the volatility of the materials under treatment. Consequently, the use of super-atmospheric pressures is contemplated.

Moreover, consideration must also be given to the fact that the resin-forming unsaturated aromatic hydrocarbons are polymerizable with heat.

For the foregoing reasons, temperatures greatly in excess of $50°$ C. are not recommended, but may be employed without departing from the broad concept of the invention.

While the use of one reagent, or reagent mixture, throughout the entire refining operation is generally desirable, the use of two or more reagents, or reagent mixtures, may be employed without departing from the broad spirit of the invention.

For example, it may be found desirable to conduct the first part of the operation with a polyhydroxy alcohol as a reagent, followed by the separation of the extract and raffinate phases, the removal of the reagent from the extract phase, and the further extraction of the hydrocarbon fraction derived from the extract phase with a second reagent, as for example, a substituted polyhydroxy alcohol, or vice versa.

After the phases have been contacted in the desired manner, separation of the phases may be accomplished by any means known in the art, such as by stratification and decantation, centrifuging or otherwise.

The reagent may be recovered from the separated hydrocarbon fractions in any desired manner, such as by distillation, either at atmospheric, sub-atmospheric, or super-atmospheric pressures, washing with water, or otherwise.

The following examples will serve to further illustrate the invention.

*Example 1*

A 203 cc. portion of a para-methyl styrene fraction, containing 53.9% by weight of para-methyl styrene, was contacted with stirring at room temperature with 625 cc. of triethylene glycol ($CH_2OH(CH_2OCH_2)_2CH_2OH$) during a period of 30 minutes.

The extract and raffinate layers were then separated and each was distilled at room temperature in a Claissen flask at a pressure of 25 mm. of mercury, absolute, to remove the reagent.

The para-methyl styrene fractions thus obtained from the layers were of approximately equal volumes.

The concentration of para-methyl styrene in the hydrocarbon fraction obtained from the extract layer was 60.4% by weight, while the concentration of para-methyl styrene in the hydrocarbon fraction obtained from the raffinate layer was 45.9% in weight. The spread in concentration secured in a single-stage batch extraction was, therefore, 14.5%.

*Example 2*

A 547 cc. portion of a para-methyl styrene fraction obtained from light oil, and containing 45.4% para-methyl styrene by weight, was contacted with 1658 cc. of triethylene glycol $(CH_2OH(CH_2OCH_2)_2CH_2OH)$ (solvent:oil ratio= 3.1) in a continuous counter-current solvent refining unit consisting of a vertical tower 1½ inch in diameter and 9 feet in length, packed with #21 iron jack chain.

The extract and raffinate phases secured were separately distilled at a pressure of 30 mm. of mercury, absolute, to remove the reagent.

The hydrocarbon fraction secured from the extract phase represented 42.4% by weight of the charge stock, and had a concentration in para-methyl styrene of 54.7% by weight.

The hydrocarbon fraction obtained from the raffinate phase contained 32.4% para-methyl styrene by weight.

The overall spread in concentration secured by extraction in a one-tower continuous counter-current extraction system, therefore, was 22.3%.

*Example 3*

A 266 cc. portion of a para-methyl styrene fraction obtained from light oil and containing 45.4% para-methyl styrene by weight, was contacted with 734 cc. of triethylene glycol $$(CH_2OH(CH_2OCH_2)_2CH_2OH)$$

(solvent:oil ratio=2.76:1) in the one-column continuous counter-current extraction unit of Example 2.

The extract and raffinate phases were then separately distilled at a pressure of 30 mm. of mercury, absolute, to remove the reagent.

The hydrocarbon fraction obtained from the extract layer represented 32.3% of the charge stock and had a concentration in para-methyl styrene of 57.4% by weight.

*Example 4*

A 483 cc. portion of a para-methyl styrene fraction obtained from light oil, and containing 62.8% by weight of para-methyl styrene, was contacted with 840 cc. of triethylene glycol $(CH_2OH(CH_2OCH_2)_2CH_2OH)$ in a continuous counter-current solvent extraction unit consisting of three packed towers arranged in series.

Each of the packed towers was 1½ inch in diameter, 9 feet in height, and was packed with #21 iron jack chain.

The extract and raffinate phases were separately distilled at a pressure of 30 mm. of mercury, absolute, to remove the reagent.

The hydrocarbon fraction obtained from the extract phase represented 46.2% of the charge stock, and had a concentration in para-methyl styrene of 71.6%.

The hydrocarbon fraction obtained from the raffinate phase had a concentration in para-methyl styrene of 50.4% by weight.

*Example 5*

A 59 cc. portion of a methyl styrene fraction obtained from light oil and containing 45.4% para-methyl styrene by weight, and 354 cc. of glycerol alpha-monochlorohydrine were agitated at room temperature for a period of 30 minutes, after which the mixture was permitted to stratify and the respective layers separated.

The extract and raffinate layers were then separately distilled at a pressure of 40 mm. of mercury, absolute, to remove the reagent.

The concentration of para-methyl styrene in the hydrocarbon fraction secured from the extract layer, representing 49.2% of the charge stock, was increased by 10.1% by this treatment.

*Example 6*

A 200 cc. portion of a para-methyl styrene fraction obtained from light oil and containing 45.3% by weight of para-methyl styrene, and 1600 cc. of propylene glycol $(CH_3.CHOH.CH_2OH)$ were vigorously agitated at room temperature during a period of 30 minutes.

The mixture then was permitted to stratify and the two layers separated.

Each of the layers was separately distilled at a pressure of 30 mm. of mercury, absolute, to remove the reagent.

The original para-methyl styrene fraction was separated into two equal portions by this treatment.

The portion obtained from the extract layer had a concentration in para-methyl styrene of 49.3%, while the portion obtained from the raffinate layer had a concentration in para-methyl styrene of 37.8%.

The overall spread in concentration, therefore, was 11.5%.

*Example 7*

A 200 cc. portion of a para-methyl styrene fraction secured from light oil and containing 45.4% para-methyl styrene by weight, and 700 cc. of monoacetin $(CH_2OH.CHOH.CH_2OOC.CH_3)$ were thoroughly agitated for a period of 30 minutes at room temperature.

The layers were permitted to stratify, after which they were separated and separately distilled at a pressure of 40 mm. of mercury, absolute, in a modified Claissen flask to remove the reagent from the respective layers.

The hydrocarbon fraction obtained from the extract layer represented 46.0% of the charge stock and had a concentration in para-methyl styrene of 49.2% by weight.

*Example 8*

A 200 cc. portion of a para-methyl styrene fraction obtained from light oil and containing 45.3% by weight of para-methyl styrene, and 400 cc. tetraethylene glycol $$(CH_2OH(CH_2OCH_2)_3.CH_2OH)$$

were vigorously agitated at room temperature during a period of 30 minutes.

The mixture was then permitted to stratify and the two layers separated.

Each of the layers was separately distilled at a pressure of 30 mm. of mercury, absolute, to remove the reagent.

The portion obtained from the extract layer represented 46% of the charge stock, and had a concentration in para-methyl styrene of 54.0% by weight. The portion obtained from the raffinate layer had a concentration in para-methyl styrene of 35.3% by weight.

The total spread in concentration secured, therefore, was 18.7%.

*Example 9*

A 200 cc. portion of a methyl styrene fraction obtained from light oil and containing 45.3% by weight of para-methyl styrene, and 1015 cc. of diethylene glycol (CH$_2$OH.CH$_2$OCH$_2$.CH$_2$OH) were vigorously agitated at room temperature during a period of 30 minutes, after which the layers were permitted to stratify.

These layers were then separated and separately distilled at a pressure of 28–31 mm. of mercury, absolute, to remove the reagent.

Approximately 50% of the charge stock was obtained from the extract layer in the form of a 53.8% para-methyl styrene fraction.

The portion obtained from the raffinate layer had a concentration in para-methyl styrene of 34.4% by weight.

The total spread in concentration, therefore, was 19.4%.

Example 10

A 40 cc. portion of a para-methyl styrene fraction obtained by the distillation of light oil from oil gas and containing 53.9% by weight of para-methyl styrene, and 203 cc. of diethylene glycol (CH$_2$OH.CH$_2$.O.CH$_2$.CH$_2$OH) were agitated for 30 minutes at room temperature, after which the layers were permitted to stratify.

The layers were then separately distilled at a pressure of 30–40 mm. of mercury, absolute, to separate the reagent.

Approximately equal volumes of the charging stock were obtained from the extract and raffinate layers.

The concentration in para-methyl styrene of the fraction obtained from the extract layer was 59.6% by weight, and the concentration in para-methyl styrene of the fraction obtained from the raffinate layer was 45.0% by weight.

The overall spread in concentration in a single stage batch extraction was 14.6%.

Example 11

A 160 cc. portion of a para-methyl styrene fraction obtained from light oil and containing 43.7% para-methyl styrene by weight, was thoroughly mixed with 160 cc. of Glycopon AA (a commercial mixture of polyhydroxy compounds).

The layers then were separated, and each distilled at a pressure of 20–30 mm. of mercury, absolute, to remove the reagent.

The fraction obtained from the extract layer represented 41.9% by weight of the charge stock, and had a concentration in para-methyl styrene of 54.3%.

The fraction obtained from the raffinate layer had a concentration in para-methyl styrene of 34.8% by weight.

The overall spread in concentration secured by a single-stage batch extraction, therefore was 19.5%.

Example 12

A 75 cc. portion of a para-methyl styrene fraction (containing 53.9% by weight of para-methyl styrene) and 375 cc. of a commercial mixture of various polyhydroxy compounds were thoroughly agitated for a period of 30 minutes at room temperature, after which the layers were permitted to stratify.

The layers were then separately distilled at a pressure of 33 mm. of mercury, absolute, to remove the reagent.

Approximately equal quantities were obtained from the layers.

The concentration of para-methyl styrene in the fraction secured from the extract layer was 60.2%, and the concentration of para-methyl styrene in the fraction secured from the raffinate layer was proportionally reduced.

The starting material in each of the foregoing examples was substantially entirely aromatic in nature in view of its source, namely, light oil, and since each fraction obtained in said experiments contained a considerable quantity of material separated from the starting material each fraction was obviously predominately aromatic in nature. Thus a starting material predominately aromatic in nature was separated in each of said experiments into two fractions each of which was predominately aromatic in nature.

Any desired solvent to oil ratio suitable for the purpose may be employed. As a rule, it is usually desirable to keep this ratio as low as possible in order to minimize reagent recovery costs. As an example, solvent to oil ratios ranging from 1 to 1 to 20 to 1 will be found satisfactory, provided, of course, that the temperature employed is sufficiently low, or the solubility is otherwise reduced, when necessary to cause the formation of the required two liquid phases.

The resin-forming unsaturated aromatic hydrocarbons or solutions thereof, obtained as above described, may if desired, be further purified, such as by partial polymerization followed by distillation, or by acid or alkali washing, by clay contacting, by percolation through finely divided metallic particles, etc. Furthermore, a suitable inhibitor or inhibitors such as pyrogallol or hydroquinone, or the like, may be added to the material under treatment before, during, or after solvent extraction in order to reduce polymerization losses.

The light oil hydrocarbon fractions treated may be obtained from light oil in any desired manner, of which distillation is the more usual.

These fractions may have any desired boiling range, but it is preferred, in the interest of segregating the resin-forming unsaturated aromatic hydrocarbons from each other, that the boiling ranges of the fractions thereof do not overlap. As a general rule, the narrower the boiling range of the fraction the more satisfactory the results.

For instance, crude styrene fractions may have a boiling range of from 125 to 160° C. or possibly wider, although I prefer crude styrene fractions with boiling ranges which do not greatly exceed 140° C. to 150° C.

Excellent results have been obtained when treating crude styrene fractions with boiling ranges within 142° C. and 148° C.

The same applies comparably to other fractions of resin-forming unsaturated aromatic hydrocarbons.

For instance, a valuable methyl styrene fraction composed largely of para-methyl and meta-methyl styrenes is obtained from light oil when at least approximately 80% boils between 167° C. and 175° C. Likewise, a valuable indene fraction is obtained from light oil when at least approximately 80% boils between 177° C. and 186° C.

It is well known in the art that these fractions are not only predominately aromatic in nature but almost entirely so. It is also well known that the material present in fractions of this character other than resin-forming unsaturated aromatic material, that is, unsaturated aromatic material in which unsaturation appears other than in benzene rings, is comprised predominately, if not entirely, of saturated aromatic material, that is, aromatic material in which unsaturation does not appear other than in benzene rings.

As above pointed out, it may be said that, in general, and with all other conditions unchanged, the extent of purification will be directly proportional to the narrowness in boiling range of the starting material.

An interesting difference between solvent extraction as applied to mineral oil lubricating stocks and as applied to the resin-forming unsaturated aromatic hydrocarbons respectively, lies in the manner in which the desired materials concentrate in the two liquid phases produced.

In the solvent extraction of a lubricating stock, the desired material concentrates in the raffinate phase, whereas in the solvent extraction of light oil fractions the more valuable material, namely, the resin-forming unsaturated aromatic hydrocarbons, concentrate in the extract phase.

This essential difference between the two processes has an enormous influence upon the selection of solvents, making all of the solvents employed for treating lubricating oils generally unsuitable for the purposes accomplished by this invention.

It is to be understood that the above particular description is by way of illustration and that changes, omissions, additions, substitutions, and/or modifications might be made within the scope of the claims without departing from the spirit of the invention.

I claim:

1. A process for the separation of a mixture predominately aromatic in nature and containing unsaturated aromatic material in which unsaturation appears other than in benzene rings and saturated aromatic material in which unsaturation does not appear other than in benzene rings into portions predominately aromatic in nature one of which contains a higher concentration of said unsaturated aromatic material and another of which contains a higher concentration of said saturated aromatic material than said original mixture, which comprises extracting said mixture with a polyhydric alcohol to form two phases, separating said phases, and segregating the aromatic material of each of said phases to obtain said portions.

2. A process for the separation of unsaturated aromatic material in which unsaturation appears other than in benzene rings in higher concentration from a mixture predominately aromatic in nature and comprising said unsaturated aromatic material and saturated aromatic material in which unsaturation does not appear other than in benzene rings comprising extracting said mixture with a polyhydric alcohol in a manner resulting in the formation of two phases one of which comprises a solution in polyhydric alcohol of a part only of said mixture, separating said solution of polyhydric alcohol and solute from the undissolved part of said mixture, and separating said solute from said polyhydric alcohol to obtain said unsaturated aromatic material in higher concentration than in said original mixture.

3. A process for the separation of a light oil fraction predominately aromatic in nature and containing resin-forming aromatic material and non-resin-forming aromatic material into an extract phase in which the ratio of resin-forming aromatic material to non-resin-forming aromatic material is higher than in said original fraction and into a raffinate phase in which the ratio of resin-forming aromatic material to non-resin-forming aromatic material is lower than in said original fraction, comprising contacting said fraction wth a polyhydric alcohol in a manner resulting in the formation of two liquid phases one of which comprises said extract phase and the other of which comprises said raffinate phase, and separating said phases.

4. A process for extracting styrene in higher concentration from a light oil styrene fraction predominately aromatic in nature, which comprises contacting said fraction with a polyhydric alcohol having not more than four hydroxyl groups in a manner to form two phases in one of which a part of said light oil fraction is selectively dissolved in said polyhydric alcohol, separating said solution of polyhydric alcohol and selectively dissolved part from the undissolved part of said light oil fraction, and thereafter separating said dissolved part of said light oil fraction from said polyhydric alcohol to produce an extract in which styrene is of higher concentration than in said original fraction.

5. A process for extracting methyl styrene in higher concentration from a light oil methyl styrene fraction predominately aromatic in nature, which comprises contacting said fraction with a polyhydric alcohol having not more than four hydroxyl groups in a manner to form two phases in one of which a part of said light oil fraction is selectively dissolved in said polyhydric alcohol, separating said solution of polyhydric alcohol and selectively dissolved part from the undissolved part of said light oil fraction, and thereafter separating said dissolved part of said light oil fraction from said polyhydric alcohol to produce an extract in which methyl styrene is of higher concentration than in said original fraction.

6. A process for extracting indene in higher concentration from a light oil indene fraction predominately aromatic in nature, which comprises contacting said fraction with a polyhydric alcohol having not more than four hydroxyl groups in a manner to form two phases in one of which a part of said light oil fraction is selectively dissolved in said polyhydric alcohol, separating said solution of polyhydric alcohol and selectively dissolved part from the undissolved part of said light oil fraction, and thereafter separating said dissolved part of said light oil fraction from said polyhydric alcohol to produce an extract in which indene is of higher concentration than in said original fraction.

7. A process comprising subjecting a styrene containing light oil to fractional distillation to obtain a cut predominately aromatic in nature the preponderate part of which boils between 142° C. and 148° C., intimately contacting said cut with a polyhydric alcohol having not more than four hydroxyl groups under conditions which result in the formation of two liquid phases each of which except for polyhydric alcohol contained therein is predominately aromatic in nature, separating said phases, and removing polyhydric alcohol from the phase containing the higher concentration of polyhydric alcohol to obtain said styrene in a more highly concentrated form than in said original cut.

8. A process comprising subjecting a methyl styrene containing light oil to fractional distillation to obtain a cut predominately aromatic in nature the preponderate part of which boils between 167° C. and 175° C., intimately contacting said cut with a polyhydric alcohol having not more than four hydroxyl groups under conditions which result in the formation of two liquid phases each of which except for polyhydric alcohol contained therein is predominately aromatic in nature, separating said phases, and removing polyhydric alcohol from the phase containing the higher concentration of polyhydric alcohol to obtain said methyl styrene in a more highly concentrated form than in said original cut.

9. A process comprising subjecting an indene containing light oil to fractional distillation to obtain a cut predominately aromatic in nature the preponderate part of which boils between 177° C. and 186° C., intimately contacting said cut with a polyhydric alcohol having not more than four hydroxyl groups under conditions which result in the formation of two liquid phases each of which except for polyhydric alcohol contained therein is predominately aromatic in nature, separating said phases, and removing polyhydric alcohol from the phase containing the higher concentration of polyhydric alcohol to obtain said indene in a more highly concentrated form than in said original cut.

10. A process comprising intimately contacting a light oil fraction predominately aromatic in nature and containing a resin-forming unsaturated aromatic hydrocarbon with diethylene glycol under conditions causing the formation of two liquid phases to produce portions of said light oil fraction each predominately aromatic in nature and respectively richer and poorer in said resin-forming unsaturated aromatic hydrocarbon than said original fraction.

11. A process comprising intimately contacting a light oil fraction predominately aromatic in nature and containing a resin-forming unsaturated aromatic hydrocarbon with triethylene glycol under conditions causing the formation of two liquid phases to produce portions of said light oil fraction each predominately aromatic in nature and respectively richer and poorer in said resin-forming unsaturated aromatic hydrocarbon than said original fraction.

12. A process comprising intimately contacting a light oil fraction predominately aromatic in nature and containing a resin-forming unsaturated aromatic hydrocarbon with tetraethylene glycol under conditions causing the formation of two liquid phases to produce portions of said light oil fraction each predominately aromatic in nature and respectively richer and poorer in said resin-forming unsaturated aromatic hydrocarbon than said original fraction.

FRANK J. SODAY.